United States Patent
Aubauer et al.

(10) Patent No.: US 7,263,196 B2
(45) Date of Patent: Aug. 28, 2007

(54) MOBILE COMMUNICATIONS TERMINAL WITH FLAT LOUDSPEAKER DISPOSED IN THE TERMINAL HOUSING

(75) Inventors: Roland Aubauer, Bocholt (DE); Michael Hülskemper, Hünxe (DE)

(73) Assignee: Siemens Aktiengesellschaft, Munich (DE)

( * ) Notice: Subject to any disclaimer, the term of this patent is extended or adjusted under 35 U.S.C. 154(b) by 413 days.

(21) Appl. No.: 10/266,723

(22) Filed: Oct. 8, 2002

(65) Prior Publication Data

US 2003/0068056 A1    Apr. 10, 2003

(30) Foreign Application Priority Data

Oct. 8, 2001    (EP) ................... 01123335

(51) Int. Cl.
*H04R 1/02* (2006.01)
*H04M 1/00* (2006.01)

(52) U.S. Cl. ............. 381/332; 381/152; 379/433.02; 455/569.1

(58) Field of Classification Search ......... 381/332, 381/150, 190, 111, 116–117, 152, 334; 174/255; 700/94; 455/90.2, 90.3, 550, 575.1, 569.1; 379/433.02
See application file for complete search history.

(56) References Cited

U.S. PATENT DOCUMENTS 5,974,655 A * 11/1999 Lindman et al. ............... 29/594
6,336,367 B1 * 1/2002 Raisanen ..................... 73/632
6,427,017 B1 * 7/2002 Toki ........................ 381/190
2001/0009202 A1 * 7/2001 Metzelaar et al. .......... 174/255
2001/0026625 A1   10/2001 Azima et al.
2001/0055987 A1 * 12/2001 Tsuchida .................... 455/575
2002/0006809 A1 * 1/2002 Kubo et al. ................. 455/550
2003/0002697 A1 * 1/2003 Mellow ..................... 381/190
2003/0027589 A1 * 2/2003 Wennemer et al. ......... 455/550

FOREIGN PATENT DOCUMENTS

| DE | 019752189 A1 | * | 5/1999 |
| DE | 2005-556428 | * | 8/2005 |
| GB | 2 360 901 | | 10/2001 |
| JP | 2005-409466 | * | 5/2005 |
| WO | WO 00/69212 | | 11/2000 |
| WO | WO 01/31971 | | 5/2001 |

* cited by examiner

*Primary Examiner*—Xu Mei
(74) *Attorney, Agent, or Firm*—Bell, Boyd & Lloyd LLP

(57) ABSTRACT

A mobile communications terminal is provided which is designed to transmit speech signals and to receive and reproduce speech signals, and which has a speech-reproduction device, wherein improved speech quality is achieved in that the speech-reproduction device has a sound transducer, which is disposed inside a housing of the mobile communications terminal, and at least one sound transmission opening provided in the housing, which forwards the sound generated by the sound transducer to the outside of the mobile communications terminal.

9 Claims, 2 Drawing Sheets

US 7,263,196 B2

MOBILE COMMUNICATIONS TERMINAL WITH FLAT LOUDSPEAKER DISPOSED IN THE TERMINAL HOUSING

BACKGROUND OF THE INVENTION

The present invention relates to a mobile communications terminal which is designed to transmit speech signals and to receive and reproduce speech signals, and which has a speech-reproduction device.

In mobile communications terminals of this type, speech reproduction or audio reproduction is carried out almost exclusively with the aid of very small, dynamic sound transducers which are attached directly behind a front panel of the communications terminal. Due to the ever-shrinking dimensions of the housings of communications terminals, and as a result of the interest in increasingly large display panels, only very limited space is available on the front of the device for the speech-reproduction device. This causes a miniaturization of the speech-reproduction device, resulting in a reduction in the efficiency and a deterioration in the sound quality of the speech-reproduction device used in the mobile communications terminal.

On this basis, an object of the present invention is to improve the speech quality of a mobile communications terminal.

SUMMARY OF THE INVENTION

This object is solved in the aforementioned mobile communications terminal in that the speech-reproduction device has a sound transducer which is disposed inside a housing of the mobile communications terminal, and that at least one sound transmission opening is provided in the housing to forward the sound produced by the sound transducer to the outside of the mobile communications terminal.

Due to the selected arrangement of the sound transducer, account is advantageously taken of the fact that the space normally occupied (according to the state of the art) on the front of a mobile communications terminal by a speech-reproduction device, such as a loudspeaker, can be made available to other components, such as an enlarged display. The sound generated inside the housing is forwarded to the outside via the at least one sound transmission opening whereby, for example, sound transmission openings distributed over the front of the housing can be provided.

The sound transducer is preferably designed as a flat loudspeaker with a diaphragm and actuation parts for the diaphragm. The use of a flat loudspeaker offers the advantage that it can extend over large areas inside the housing of a mobile communications terminal, so that a large effective area is available for sound radiation. Further advantages of the use of a flat loudspeaker are that it has a particularly low structural height, which is desirable for space-saving reasons, and the excursions of the diaphragm have no significant effect on the total required housing volume of the mobile communications terminal.

The sound transducer, such as the flat loudspeaker or a dynamic sound transducer, is preferably fitted to the inside wall of the housing. In the case of a flat loudspeaker, its diaphragm extends, for example, substantially over the entire cross section of the mobile communications terminal.

Alternatively, the sound transducer also can be integrated into a circuit board of the mobile communications terminal. If the sound transducer is designed as a flat loudspeaker, the area of the circuit board behind the display, for example, can be used to dispose the flat loudspeaker. A combination of the flat loudspeaker with a keypad contact area of the mobile communications terminal is also possible.

In design forms in which the sound transducer is designed as a flat loudspeaker, the diaphragm is formed, for example, by a plastic film or plate, whereby the actuation parts for the diaphragm may be piezo-ceramic actuators or dynamic actuators, with which the diaphragm is provided. The diaphragm dimensions in flat loudspeakers exceed those of known dynamic sound transducers by orders of magnitude, so that they are favorable for increased sound pressure. Increased sound pressure is particularly desirable if hands-free operation of the mobile communications terminal is also required. The arrangement of the flat loudspeaker inside the housing and the radiation of the sound through a number of distributed sound transmission openings ensures that, if hands-free mode is mistakenly activated, damage to the hearing is avoided, which may occur in known combinations of sound transducers with large diaphragm excursions and very small sound openings.

The sound transducer provided inside the housing may be combined with at least one further sound transducer, such as a sound transducer which is normally disposed behind the front panel of a mobile communications terminal. In this case, the effective acoustic radiation area of the speech-reproduction device of the mobile communications terminal is increased without the need for a similar increase in the housing volume. This significantly improves the sound of the speech-reproduction device, particularly in terms of bass reproduction.

The sound transducer also may be combined with the further sound transducer to form a two-way system. In particular, the further sound transducer can be designed as a display loudspeaker, whereby the display surface or the display protection window is used for sound radiation. Display loudspeakers of this type are well suited to the reproduction of a sound frequency range above 1 kHz. It is, therefore, preferable if the sound transducer disposed inside the housing is designed to radiate sound at a frequency lower than 1 kHz, and if the further sound transducer, such as the display loudspeaker, is designed to radiate sound at a frequency higher than 1 kHz. It must be emphasized that the sound transducer disposed inside the housing may, for example, be a flat loudspeaker, as explained above, or a dynamic sound transducer. The two-way system implemented in this way enables high-quality reproduction of a broad frequency range for the sound.

Additional features and advantages of the present invention are described in, and will be apparent from, the following Detailed Description of the Invention and the Figures.

DETAILED DESCRIPTION OF THE INVENTION

Figure 1:
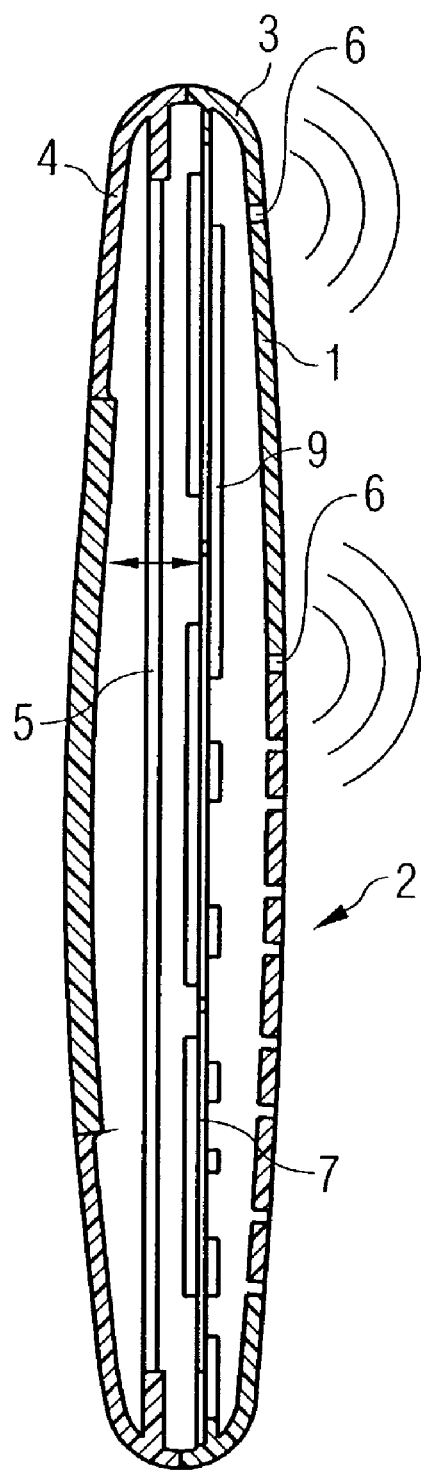
FIG. 1 shows a longitudinal section of a mobile communications device with a flat loudspeaker disposed inside the housing.

As shown in FIG. 1, an example of a mobile telephone has a display cover 1, to protect an underlying display panel 9 and a keypad 2, on an upper casing 3 of a housing of the mobile telephone.

A lower casing 4 of the mobile telephone which, together with the upper casing 3, forms the housing of the mobile telephone, is fitted with a sound transducer in the form of a flat loudspeaker 5, which reproduces speech signals received by the mobile telephone. The flat loudspeaker 5 is fitted via piezo-ceramic or dynamic actuators on the lower casing 4 and substantially extends over the entire length of the mobile telephone. The flat loudspeaker 5 is formed from a plastic film.

The flat loudspeaker 5, seen from the display cover 1, is disposed behind a circuit board 7 of the mobile telephone. Since the circuit board 7 normally leaves a substantial part of the longitudinal section of the mobile telephone free, the sound generated by the flat loudspeaker 5 may pass by the circuit board.

For sound emission, the upper casing 3 of the mobile telephone has a number of transmission openings 6, which may be disposed around the display panel 1.

The flat loudspeaker 5 may use a large part of the housing height/width and, therefore, may have a particularly large radiation area for sound waves or, in the vicinity of peripheral suspensions of the circuit board 7 on the inside of the housing of the mobile telephone, the radiated sound reaches the transmission openings 6.

Figure 2:
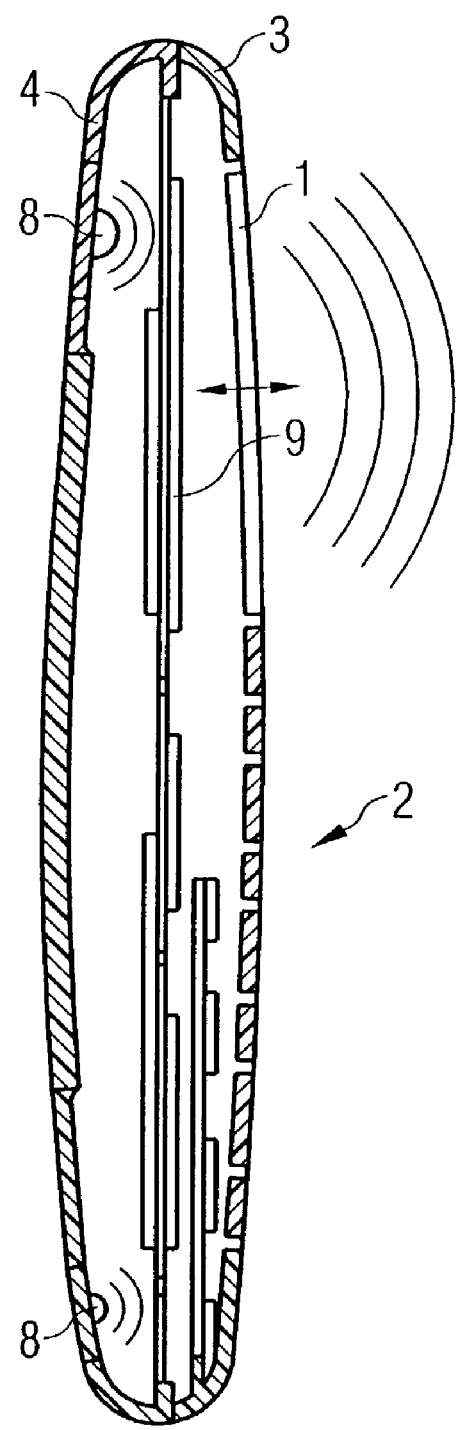
FIG. 2 shows a longitudinal section of a mobile communications device with dynamic sound transducers disposed inside the housing, combined with a display loudspeaker.

FIG. 2 shows an alternative design form of the present invention, in which the display cover 1 is designed as a display loudspeaker. In this design form, the lower casing 4 is equipped with two dynamic sound transducers 8, which are disposed directly on the inside of the lower casing 4. The dynamic sound transducers 8 are particularly suitable for the reproduction of low frequencies; for example, in the range below 1 kHz. It is emphasized that, as alternatives to one another, either a small number of large, or a comparatively large number of small, dynamic sound transducers may be provided inside the housing.

The sound radiated by the dynamic sound transducers 8 reaches transmission openings 6 in the upper casing 3 of the mobile telephone. In the design form according to FIG. 4, the transmission openings 6 are also disposed around the display cover 1, which is designed as a display loudspeaker in this design form. The display cover 1 is used to reproduce the frequency range above 1 kHz, resulting in sound radiation via two paths, of which the dynamic sound transducers on the lower casing 4 use the lower frequency range and the display panel 1, as a display loudspeaker, uses the high frequency range.

The sound radiated by the dynamic sound transducers 8 can pass in the direction of the transmission openings 6 through recesses in the circuit board 7 or in the vicinity of peripheral suspensions of the circuit board 7 covering sides of the mobile telephone housing.

In terms of the design form of a mobile telephone equipped with a number of sound transducers illustrated in FIG. 2, it must be emphasized that the dynamic sound transducers 8 shown in FIG. 2 can be replaced simply by a flat loudspeaker having a plastic film or plate, as explained above in connection with FIG. 1.

Figure 3:
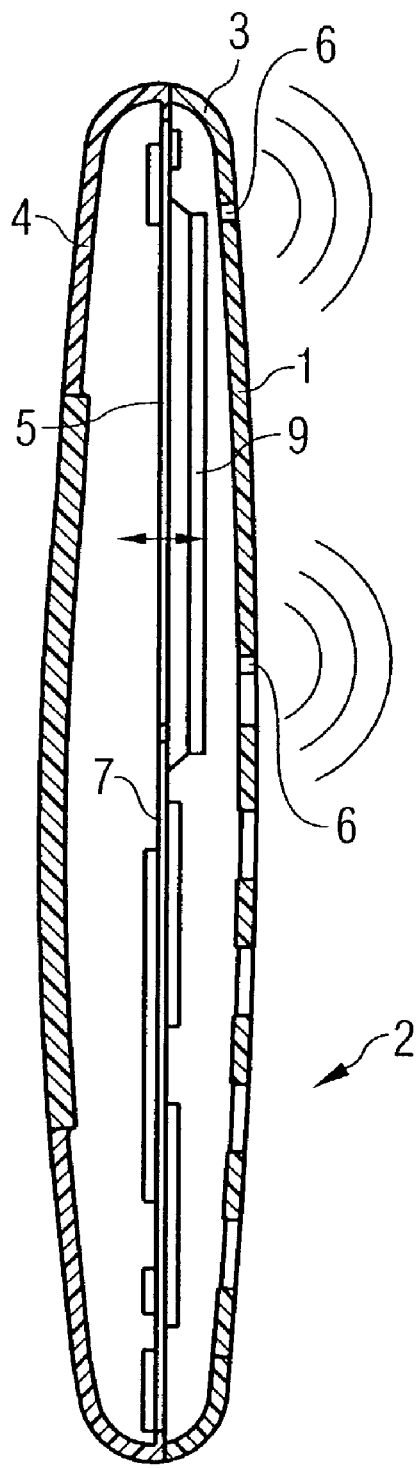
FIG. 3 shows a longitudinal section of a mobile communications terminal with a flat loudspeaker disposed inside the housing and integrated into a circuit board.

FIG. 3 shows an alternative design form for an arrangement of the flat loudspeaker 5 inside the housing of the mobile telephone. Here, the flat loudspeaker 5 is integrated into the circuit board 7 of the mobile telephone, in the present embodiment behind the display panel 9. The display panel 9 is raised via contacts above the circuit board 7 and, therefore, offers the flat loudspeaker 5 the option of connecting to the air volume in the upper casing 3 of the mobile telephone housing as well as to the transmission openings 6 on the front of the housing.

Figure 4:
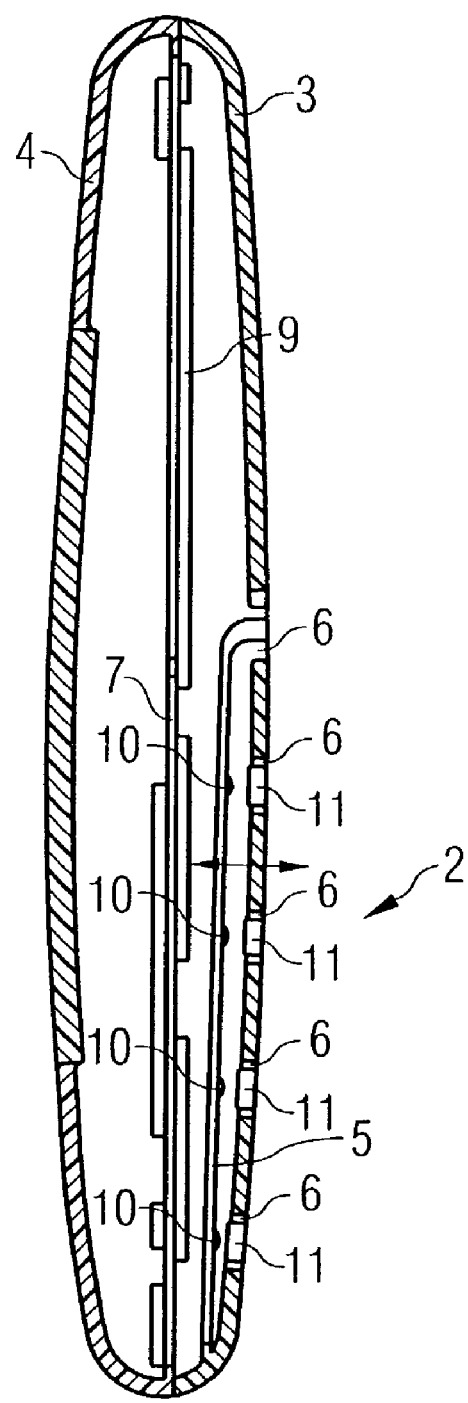
FIG. 4 shows a longitudinal section of a mobile communications terminal with a flat loudspeaker disposed inside the housing and assigned to a keypad.

A further design form for the arrangement of the flat loudspeaker 5 inside the housing of a mobile telephone is shown in FIG. 4. The design form shown relates to a mobile telephone in which the keypad units are accommodated on a separate keypad circuit board. The flat loudspeaker 5 forms this keypad circuit board, whereby contacts 10, which can be activated by push-buttons 11 disposed in front thereof, are fitted on the upper side of the flat loudspeaker 5. In the design form shown in FIG. 4, it must be noted that the sound amplitude of the flat loudspeaker 5 must be selected as small compared to the actuation path for a contact.

It must be emphasized that, in the design forms of a mobile telephone according to FIGS. 3 and 4, a combination is also possible with the display cover 1 according to FIG. 2, which is designed as a display loudspeaker. With such modifications, the flat loudspeaker 5 would itself in each case support the display loudspeaker in the low-frequency range.

Although the present invention has been described with reference to specific embodiments, those of skill in the art will recognize that changes may be made thereto without departing from the spirit and scope of the present invention as set forth in the hereafter appended claims.

The invention claimed is:

1. A mobile communications terminal for transmitting, receiving and reproducing speech signals, comprising:
   a housing having at least one sound transmission opening;
   a speech-reproduction device having a sound transducer disposed inside the housing, wherein sound produced by the sound transducer is transmitted to an outside of the mobile communications terminal via the at least one sound transmission opening; and
   a circuit board, wherein said transducer is physically integrated into the structure of the circuit board.

2. A mobile communications terminal as claimed in claim 1, wherein the sound transducer is a flat loudspeaker with a diaphragm and actuation parts for the diaphragm.

3. A mobile communications terminal as claimed in claim 2, wherein the diaphragm is a plastic film.

4. A mobile communications terminal as claimed in claim 2, wherein the actuation parts include piezo-ceramic actuators with which the diaphragm is provided.

5. A mobile communications terminal as claimed in claim 2, wherein the actuation parts include dynamic actuators with which the diaphragm is provided.

6. A mobile communications terminal as claimed in claim 1, further comprising a further sound transducer, wherein the sound transducer is combined with the further sound transducer to form a two-way system.

7. A mobile communications terminal as claimed in claim 6, wherein the further sound transducer is a display loudspeaker.

8. A mobile communications terminal as claimed in claim 6, wherein the sound transducer radiates sound at a frequency lower than 1 kHz, and the further sound transducer radiates sound at a frequency higher than 1 kHz.

9. A mobile communications terminal as claimed in claim 1, further comprising a keypad circuit board into which the sound transducer is integrated as a flat loudspeaker.

* * * * *